United States Patent
Shaikenov et al.

(10) Patent No.: US 10,865,768 B2
(45) Date of Patent: Dec. 15, 2020

(54) WIND WHEEL WITH BLADE ELBOW BEND

(71) Applicants: Blok Shaikenov, Astana (KZ); Yerzhan Blokovich Shaikenov, Almaty (KZ)

(72) Inventors: Blok Shaikenov, Astana (KZ); Yerzhan Blokovich Shaikenov, Almaty (KZ)

( * ) Notice: Subject to any disclaimer, the term of this patent is extended or adjusted under 35 U.S.C. 154(b) by 0 days.

(21) Appl. No.: 16/480,735

(22) PCT Filed: Jan. 23, 2018

(86) PCT No.: PCT/KZ2018/000003
§ 371 (c)(1),
(2) Date: Jul. 25, 2019

(87) PCT Pub. No.: WO2018/151586
PCT Pub. Date: Aug. 23, 2018

(65) Prior Publication Data
US 2019/0390647 A1 Dec. 26, 2019

(30) Foreign Application Priority Data

Feb. 14, 2017 (KZ) ................... 2017/0125.1

(51) Int. Cl.
*F03D 1/06* (2006.01)

(52) U.S. Cl.
CPC ......... *F03D 1/0658* (2013.01); *F03D 1/0675* (2013.01); *F05B 2250/314* (2013.01); *F05B 2250/36* (2013.01); *F05B 2260/79* (2013.01)

(58) Field of Classification Search
CPC ......... F03D 1/06; F03D 1/0608; F03D 1/065; F03D 1/0658; F03D 1/0675; F05B 2250/314; F05B 2250/36; F05B 2260/79
(Continued)

(56) References Cited

U.S. PATENT DOCUMENTS

| 4,412,784 A | 11/1983 | Wackerle et al. |
| 4,439,108 A | 3/1984 | Will |

(Continued)

FOREIGN PATENT DOCUMENTS

| DE | 19733372 C1 | 1/1991 |
| EP | 1923567 A2 | 5/2008 |

(Continued)

OTHER PUBLICATIONS

International Search Report and Written Opinion dated May 3, 2018 in corresponding International Patent Application No. PCT/KZ2018/000003, filed Jan. 23, 2018.

(Continued)

*Primary Examiner* — Christopher Verdier
*Assistant Examiner* — Elton K Wong
(74) *Attorney, Agent, or Firm* — Global IP Counselors, LLP

(57) ABSTRACT

A wind wheel includes a main shaft, a wind plant hub, and a plurality of blades. Each blade includes a short elbow part with axial and sleeve segments connected at 30°-45° angle and a long wing-shaped part, connected to the sleeve segment with an end shaft and by support devices with bearings. The short elbow part is made of steel, and is a distance of 1.5-5 meters or 0.20-1.5 meters from a connection thereof to the hub, and at a juncture of the axial and sleeve segments has a 10°-80° elbow bend opposite a direction of rotation of the wind wheel. The sleeve segment of the short elbow part has a cylindrical skeleton with three double support rings and is connected to the wing-shaped part of the blade, a root end of which is supplied with a hollow steel shaft with three removable protuberances with the bearings.

5 Claims, 9 Drawing Sheets

(58) Field of Classification Search
USPC .................. 384/91, 95, 129, 261, 266, 275
See application file for complete search history.

(56) References Cited

U.S. PATENT DOCUMENTS

| | | | |
|---|---|---|---|
| 9,074,581 B2* | 7/2015 | Bagepalli | F03D 1/0658 |
| 10,018,178 B2* | 7/2018 | Fernandez Falces | F03D 80/70 |
| 10,100,804 B2* | 10/2018 | Haahr | F03D 1/0658 |
| 2013/0330199 A1* | 12/2013 | Bagepalli | F03D 1/0658 |
| | | | 416/223 R |
| 2015/0159624 A1* | 6/2015 | Haahr | F03D 1/0658 |
| | | | 416/205 |
| 2015/0176567 A1* | 6/2015 | Fernandez Falces | F03D 80/70 |
| | | | 416/155 |

FOREIGN PATENT DOCUMENTS

| | | | |
|---|---|---|---|
| EP | 2886858 A1 | | 6/2015 |
| EP | 2937557 A1 | * | 10/2015 ........... F03D 1/0658 |
| EP | 2937557 A1 | | 10/2015 |
| FR | 2863318 A1 | | 6/2006 |
| JP | 4104037 B2 | | 6/2008 |
| KZ | 28871 B | | 8/2014 |
| KZ | 29206 B | | 11/2014 |
| WO | 2008064678 A2 | | 6/2008 |
| WO | 2014185758 A1 | | 11/2014 |

OTHER PUBLICATIONS

KZ Search Report dated Apr. 24, 2017 in corresponding KZ Patent Application No. 2017/0125.1, filed Feb. 14, 2017 (with English Translation of Categories of Cited Documents).
Notice of Allowance dated Apr. 2, 2019 in corresponding European Patent Application No. 18712481.3.
Yanson R. A. Wind Turbines. Bauman Moscow State Technical University, 2007, 22 pages (with English Abstract).

* cited by examiner

WIND WHEEL WITH BLADE ELBOW BEND

CROSS-REFERENCE TO RELATED APPLICATION

This application is a U.S. National Stage application of International Application No. PCT/KZ2018/000003, filed Jan. 23, 2018, which claims priority to KZ Patent Application No. 2017/0125.1, filed Feb. 14, 2017, the contents of each of which are hereby incorporated herein by reference.

BACKGROUND

Field of the Invention

The invention relates to wind power, specifically the use of wind energy to generate power using horizontal-axis turbines in low-, medium-, and high-capacity wind power plants using a three-bladed rotor. The principal element of the wind power plant for converting the kinetic energy of a wind stream is the design features of the wind wheel.

Background of the Invention

Conventional wind wheels for power plants have a horizontal axis of rotation (EP 1923567A2 of May 21, 2008, F03D 1/06), in which the blade handle is mounted with an 8-10° windward inclination from the vertical plane, which prevents destruction of the blade tips from possible contact with the tower during strong wind gusts. In a sudden wind gust, the blades of the wind wheel can assume only the vertical position, but the blade tips do not reach the engine tower.

The prior art invention disclosed KZ 28871 F03D, have blades consisting of two parts: a short root part and a long wing-shaped part. The short root part is made of strong steel covered with reinforced fiberglass sheathing, and 1.5-3.5 meters from the attachment to the plant hub it has a 30-45° elbow bend opposite to the rotor's direction of rotation. The segment of the short root part from the point of attachment to the hub up to the bend is called the axial segment, and the segment after the bend is called the sleeve segment.

SUMMARY

The disadvantage of the invention is that the short part is made of cast lithium, which complicates the technological problems of working the metal at the connection of the axial end with the hub and with the internal structure of the sleeve segment for connection with the handle of the wing-shaped part of the blade. The compatibility of the fiberglass sheathing with the steel axial short part, which have different degrees of expansion and compression under various temperature conditions (high and low temperatures), creates a certain technical difficulty.

The prior art disclosed in KZ 29206 F03D includes blades consisting of two parts: a short root part and a long wing-shaped part. The short root part consists of an axial segment connected to the hub of the wind plant and a sleeve segment to which the handle of the wing-shaped part of the blade is connected. The two segments are made separately of strong steel. The axial and sleeve segments are connected at a 30-45° angle to form an elbow bend. The angular bend is oriented backward, against the rotation of the wind wheel. Steel cables between the axial and sleeve segments are drawn to prevent breakage on the elbow bend.

The disadvantages of this invention are the narrow parameters of the angular connection of the axial and sleeve segments (30-45°) forming the elbow bend of the short root part of the blade, which limits the possible use of the lever action of the long wing-shaped blade to increase the rotational effect in other parameters. The technical concept and reliability of the hinge mechanisms of the connection of the sleeve segment skeleton with the connecting shaft of the wing-shaped blade, where the support rings of the sleeve segment and the annular protuberances of the wing-shaped blade are single, raise certain doubts. Their functionality is not clearly stated, since the end flange facing the wing-shaped blade and the locking disk on the elbow bend bear the main load on the attachment of these mechanisms.

The prior art disclosed FR 2863318A1 includes a blade handle that has a bend against the direction of the wind, and the long part of the blade assumes an angular position relative to the axis of the handle passing along the straight part, which was conceived to reduce aerodynamic perturbations created by the passage of the aforementioned blades before the tower mast. One part of the bend represents the continuation of the axial line and is partly sunken to the hub. The second part of the bend, which makes up an angle with the first part, is situated on a straight line with long wing-shaped blade, as shown in FIGS. 8, 9, and 10 (FR 2863318A1) passing from its tip to the connection with the hub. The blade handle is one piece, so the action of the lever or blade is transmitted through one support, the blade's connection to the plant hub, so distortions of the handle contribute little more to amplifying the blade rotation and correspondingly to the capacity of the wind plant.

The prior art disclosed in WO 2008/064678 A2 includes a wind power plant blade with an attaching device for mounting in a circular pitch bearing, such that the blade's axis is disposed at an angle relative to the blade's longitudinal axis, which permits elliptical intersection of the main axis, and the distance between the outer part of the blade and the support is increased, while the front edge of the blade rises upward toward the wind.

According to the description, this is achieved by the fact that the blades consist of two parts: a short base that is secured to the hub of the plant, perpendicularly to the horizontal axis of the main shaft, and a long blade mounted on the pitch plane (Yuryev-Sikorsky device) of the short part, which can then also perform rotation along its longitudinal axis. The main purpose of this two-part device is to ensure stable separation of the rotating blade from the wind plant tower "in a more complex and advanced manner than conventional pitch-adjusted turbines, where by pitching, the blades can be turned about their longitudinal axis."

In the prior-art analog WO 2008/064678 A2, turning of the pitch bearing alters two angles, both blade axial rotation angle 404 (FIG. 4 of WO 2008/064678 A2) and blade separation angle from the tower (not shown in the figures). This is due to the design of the pitch bearing and accordingly the blade's orientation in space. Obviously, at angle 404=0, the angle between the mast and blade will also be zero. If the bending and inclination occupy a transverse position to the main axis of the main shaft, a long blade can assume a position parallel to the plant tower and the danger of contact between the blade and the tower can be created in a strong wind stream (FIG. 11 of WO 2008/064678 A2).

The disadvantage of this invention is the unreliability of the joint of the short part with the long blade and the complexity of the mechanisms for controlling blade position while maintaining the inclination of the long blade's axis and simultaneously turning it about its axis. The device is adapted from mechanisms for securing helicopter blades and can operate only with a short piece having a small length. With a short piece of significant length, the effects of blade weight (which can reach two to seven tonnes in medium- and high-capacity plants) and wind pressure can subject all the mechanisms to rapid failure of connections, so the invention's industrial applicability may be limited.

The prior art described in WO 2014/185758 A1 and EP 2 937 557 B1 is an analogue of KZ 29206.

As disclosed in KZ 32278 F03D, the blade is comprised of two parts: a short elbow part and a long wing-shaped part. This invention takes into account certain omissions in the invention design made by the authors, particularly, the angular connection of axial and sleeve segments of the blade is increased within 10-80, the technical effectiveness of the design invention of the short part of the blade with an elbow bend is determined where force application moment is strengthened using additional axial segment and angular connection of a long-wing part of the blade. Here, $F=F_1+F_2$. Hereby, a secure and new way of connecting sleeve segment of the short elbow part of the blade with long-wing part of the blade is offered, where the sleeve segment contains three rows of double annular supports.

The objective of the present invention is to create a wind wheel (rotor) design that makes efficient use of the kinetic energy of the freely incident wind motion with a greater than $16/27$ of wind capture coefficient (Yanson, 2007).

The technical result of the invention is to increase wind energy utilization due to the special design of the wind wheel and to reduce the wind plant's material expenditure and weight.

This is accomplished by the fact that, in order to make efficient use of the incident free wind stream, the blade in the new rotor design is shaped like a hockey stick (FIG. 5). In the claimed rotor design, the blade includes two parts: a short root part with an elbow bend (FIGS. 1A, 1B, 5, and 6) and a long wing-shaped part 8 (FIGS. 5 and 6). The short elbow part of the blade is divided into an axial segment 3 (FIGS. 1A, 5, and 6), which is secured to the hub 9 (FIGS. 1A, 5 and 6) mounted on the main shaft 2 (FIGS. 5 and 6) of the wind turbine and a sleeve segment 4 (FIGS. 1B, 5 and 6) to which the long wing-shaped part 8 is connected (FIGS. 4,5, and 6). The axial and sleeve segments are connected at a 10-80° angle (elbow bend) relative to the primary axis of the attachment and opposite to the blades' direction of rotation (FIGS. 5 and 6).

The determination of the bend angle of the short elbow part at the joint of the axial and sleeve segments at a 10-80° angle depends on the creation of high resistance to the incident wind flow on the plane of the wing-shaped blade. The strength of the connection at a bend angle of less than 10° entails technical problems because it increases the bending pressure of the force of gravity of the wing-shaped part, which is amplified by the torque of the aerodynamic wind pressure and the twisting effect of the opposing wind on the blades. Increasing the angle beyond 80° on the elbow bend of the wind wheel blade, increasing the resistance to the wind stream, creates additional aerodynamic load. A more optimal aerodynamic effect from the double lever system of the wind wheel design is achieved at a 30-60° elbow bend angle between the axial and sleeve segments.

Making a one-piece short elbow section under factory conditions is difficult for technological reasons. Therefore, the axial and sleeve segments of the short elbow part of the blade are made separately of strong steel. Their design is universal in the use of various rotor types.

The dimensions and length of the axial and sleeve segments of the short root part depend on the principles of use and the planned capacity of the wind engine. To obtain high efficiency from the design features of the lever-shaped blades with two force application fulcrums (arms), two rotor design variants are offered.

In Wind Wheel Option 1, the axial segment of the elbow part on has a length of 1.5-5 meters ($1/10$- $1/20$ of the blade length), and its root end is attached to the hub of the wind plant 9 (FIGS. 1A and 5). In strengthening the design of the connection of the axial and sleeve segments, the long wing-shaped part of the blade as a lever arm affords high mechanical force for a relatively low length. At the specified blade length, calculated for the specific capacity of modern wind plants, the use of the rotor design described herein can amplify the wind engine capacity by a somewhat significant amount.

At sites with naturally strong wind pressures, a more preferred embodiment can be the Wind Wheel Option 2 design, where the axial segment of the short elbow part 3 (FIG. 6) extends 0.2-1.5 meters outside the outer circle of the hub (facing the bend side). Inside the hub is a central drum 30 (FIG. 6) with worker access openings 31 (FIG. 6), permitting technical work to service the mechanisms of the axial and sleeve segments. The hub of the wind plant can be equal to or somewhat greater than the width of the nacelle, but does not impact the aerodynamic load on the plant.

BRIEF DESCRIPTION OF THE DRAWINGS

The fundamental difference in the rotor blade design of the present invention, and the shapes and structure of parts and diagrams of their connections, are shown in the following figures.

DETAILED DESCRIPTION OF THE EMBODIMENTS

Figures 1A, 1B:
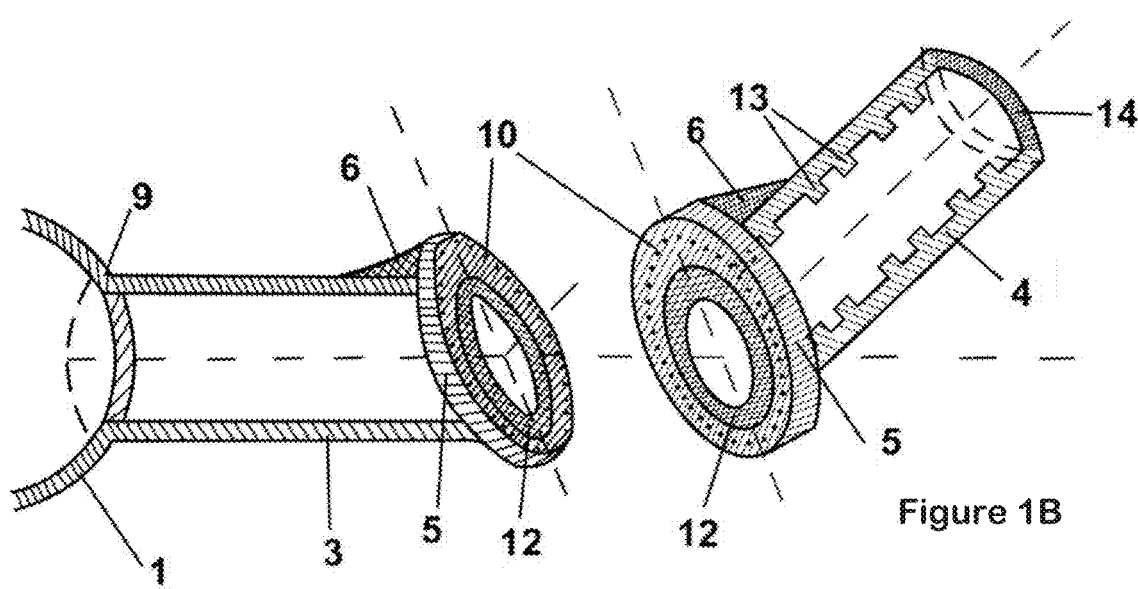
FIG. 1 shows the schematic structure of the axial (FIG. 1A) and sleeve (FIG. 1B) segments of the short elbow part of the blade.

The structural details of the axial (FIG. 1A) and sleeve (FIG. 1B) segments of the short elbow part of the blade include the following: plant hub 1, which is connected to the main shaft of the engine, axial part cylindrical skeleton 3, sleeve segment cylindrical skeleton 4, axial and sleeve segment wall 12, top edge protuberance 5 for connecting the axial and sleeve segments, additional steel reinforcement of the edge and wall on the inside of the bend 6, edge holes 10, sleeve segment annular supports 13, and sleeve segment face end 14 for connection to the wing-shaped blade.

Figure 4:
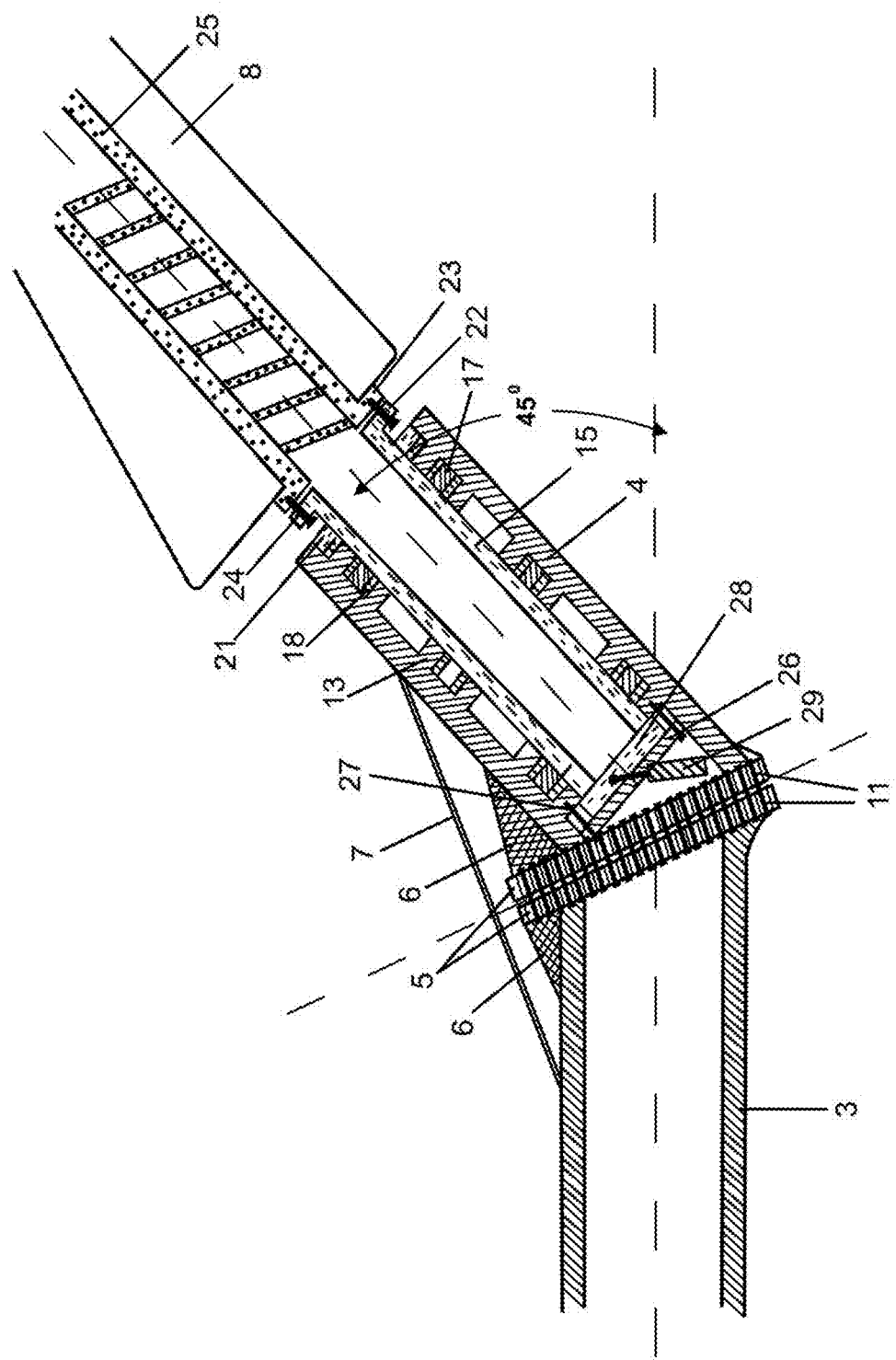
FIG. 4 diagrams the connection of the axial and sleeve segments of the short part and the connection of the sleeve segment with the end shaft of the wing-shaped blade.
Figure 5:
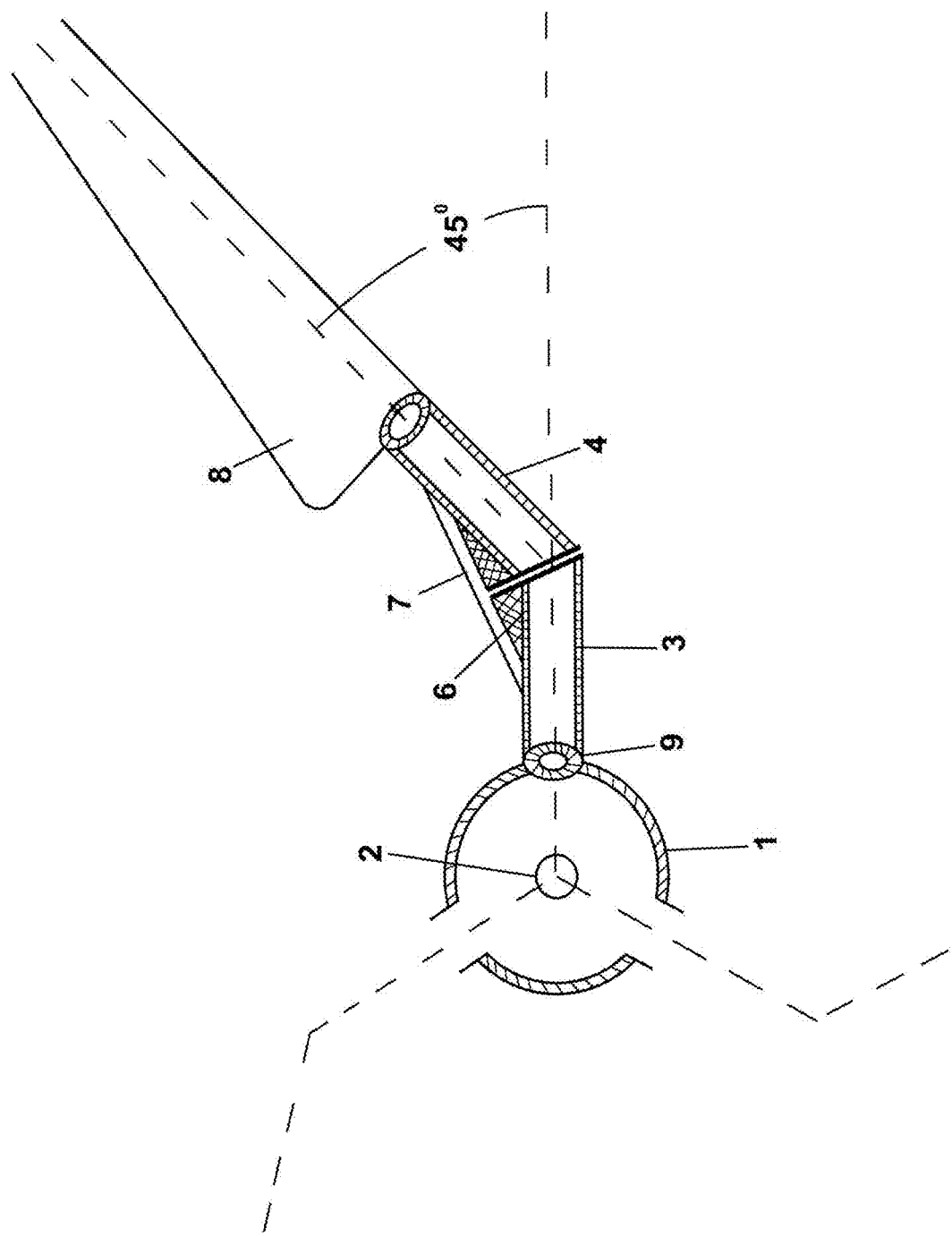
FIG. 5 diagrams the fully assembled wind wheel blade, where the axial and sleeve segments have lengths of 1.5-5 meters (Wind Wheel Option 1)
Figure 6:
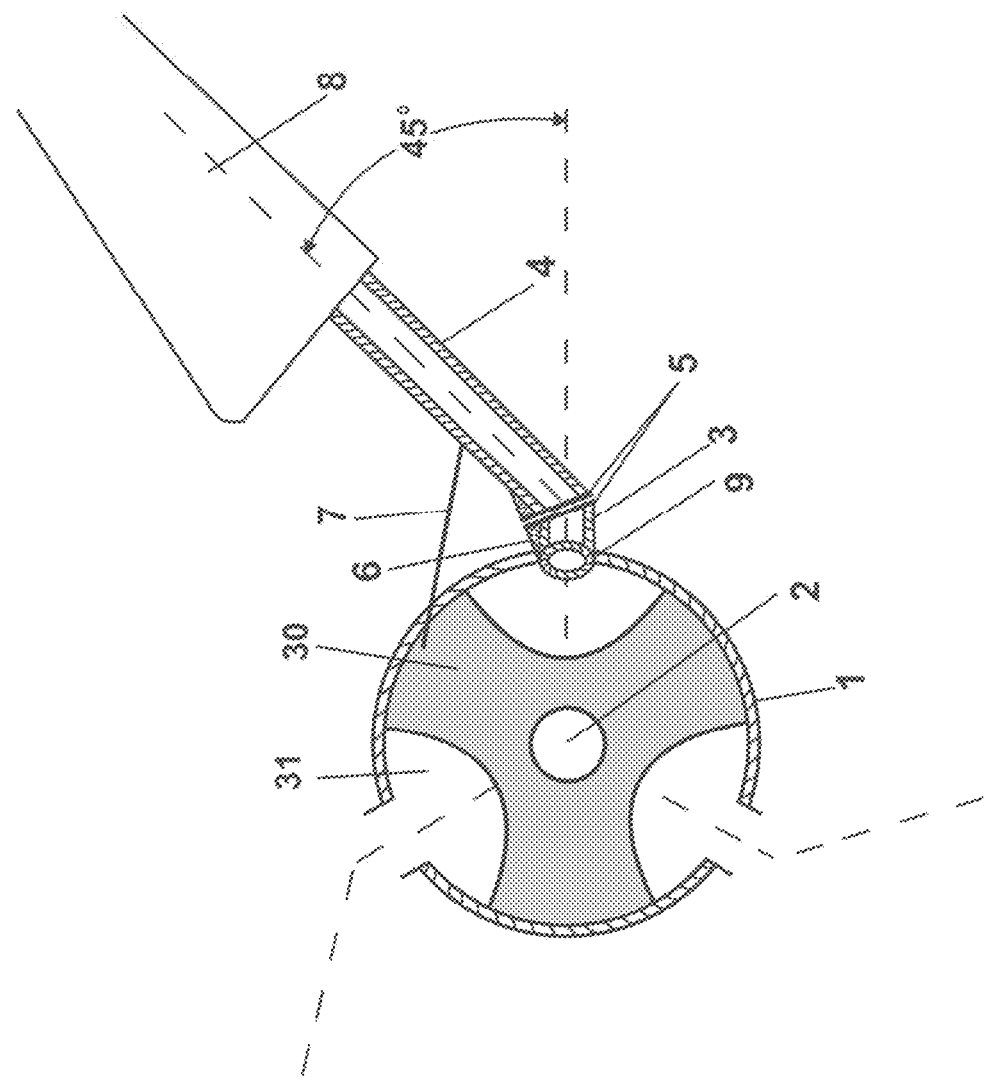
FIG. 6 diagrams the assembled wind wheel blade, where the length of the axial segment is short, 0.2-1.5 meters (Wind Wheel Option 2)

The axial segment has a hollow cylindrical shape (FIG. 1A), and is connected by bolts (not shown) to the wall of wind plant hub opening 9. The end of the axial part facing the bend has an elliptical shape, obliquely canted along the half-arc line between the axial line of the axial and sleeve parts running through their intersection point. The slope is directed outward from the direction of rotation (FIGS. 4, 5, and 6). Along the entire perimeter of the cylindrical opening is lateral edge 5 for securing the two segments of the short elbow segment. The top side of the edge, located on the inner part of the bend, is reinforced with additional steel reinforcement 6. The sides and back of the edge have a downward slope filling the transition of the cylindrical wall to the edge. Along the perimeter of the edge, the requisite number of holes 10 are drilled for bolt connection with the sleeve segment.

The sleeve segment can be somewhat shorter than the axial segment or of equal length. The sleeve segment has a cylindrical shape (FIG. 1B) and actually duplicates the annular segment in design. The sleeve segment differs in having three double annular supports 13 (FIGS. 1B and 2), which accommodate the support of the protuberances of the root shaft of the wing-shaped blade 17 (FIG. 2), with bearings 18 (FIGS. 2 and 4) installed on its lateral surface. The end of the sleeve facing the axial segment also has an obliquely canted opening along the half-arc line between the axial line of the axial and sleeve segments running through their intersection point. The slope is directed toward the outer end of the sleeve. The elliptical opening is bordered by a lateral edge 5 (FIG. 1B), and its top edge facing the bend is strengthened with additional steel reinforcement 6. The sides and back of the edge have a downward slope filling the transition of the cylindrical wall to the edge. Along the perimeter of the edge of the obliquely canted end of the sleeve segment are a calculated number of holes 10, which accommodate a bolted connection 11 (FIG. 4) with the axial segment of the short elbow part.

The long wing-shaped blade 8 (FIGS. 4, 5, and 6) is made of fiberglass, and its cavity contains a blade hold-down beam 25 (FIG. 4) made of fiberglass with composite materials.

The connection of the wing-shaped blade with the sleeve segment of the short elbow part is made through the blade end shaft 15 (FIG. 4), which is made of steel. The shaft skeleton has a hollow cylindrical shape, smooth on the outside, and has annular support expanded edge 22 on the outer end, and narrowing with multifaceted star shape and smooth cylindrical end (not shown) on the other end. The support annular shaft edge 22 is secured by bolts 24 to the long wing-shaped blade skeleton root reinforcement 23 (U.S. Pat. No. 4,412,784, and FRG invention DE 19733 372 C1. The shaft of the wing-shaped blade simultaneously supports rotation of the blade along its axis.

Figure 2:
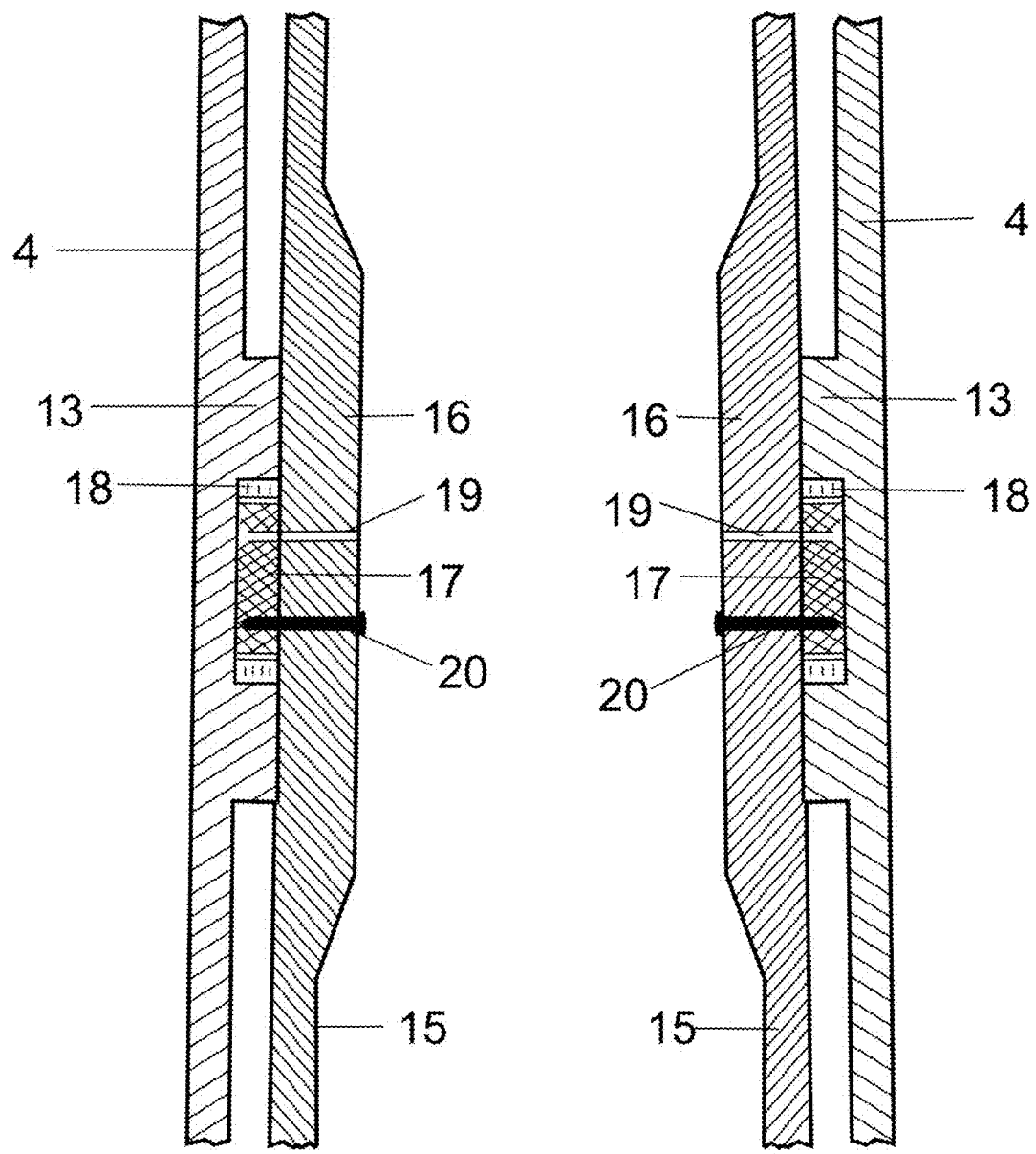
FIG. 2 shows a cross-section of the connection point of the sleeve segment of the short part and the end shaft of the wing-shaped blade.
Figure 3:
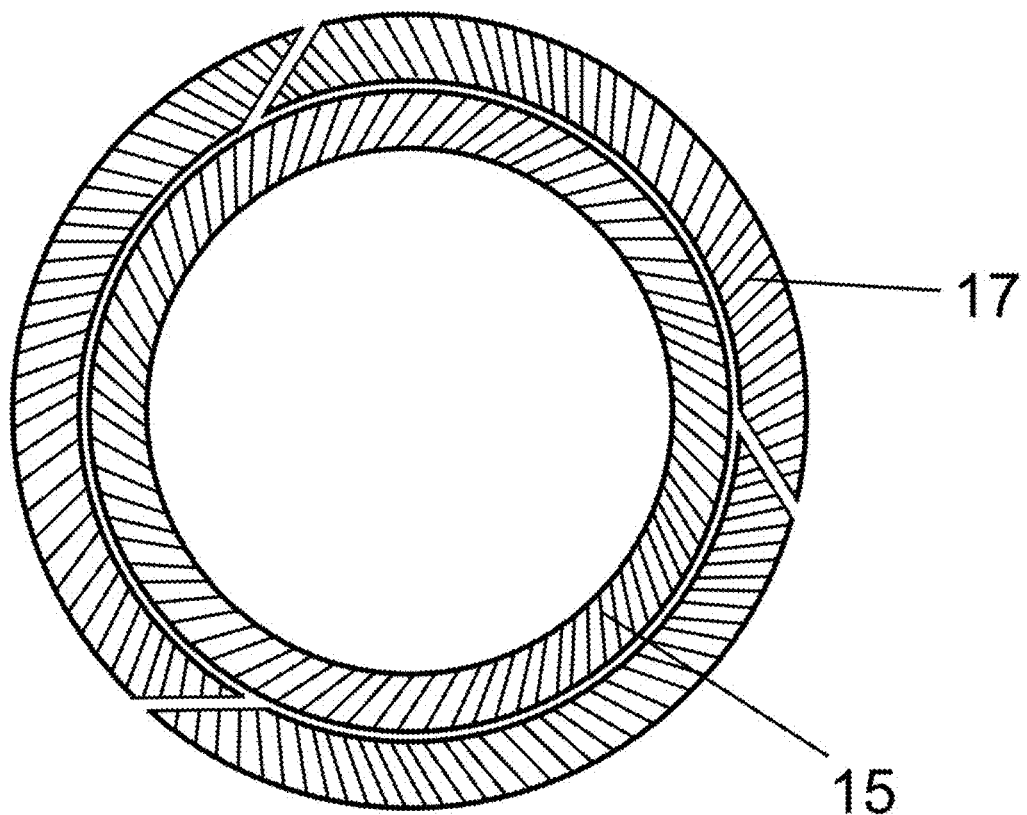
FIG. 3 shows a cross-section of the shaft of the wing-shaped blade with three inset segmented annular protuberances.

A longitudinal cut of the connection point of attachments of the sleeve segment and shaft of the wing-shaped blade is shown in FIG. 2, where sleeve segment skeleton 4, sleeve segment annular supports 13, wing-shaped blade shaft wall 15, shaft reinforcement 16, inset removable annular protuberances 17 with bearings 18, shaft wall and inset protuberance holes 19, and securing bolts 20. There are two types of bearings: finger-type and ball-type. The finger type bearings are installed transversely on the lateral edge, while ball-type on the external side of removable annular protuberances, between the shaft wall and inset of proturbance holes. Their purpose is to provide tight contact of transverse annular support to the annular supports of the sleeve segment, and an easy turn of the shaft along its axis. The shaft wall and removable protuberance may have tubular channels (not shown) that open in the bearing races, and have lubrication fittings on the shaft cavity side. FIG. 3 depicts the cross section of wing-shaped blade shaft wall 15 and its three inset segmented protuberances 17.

The shaft of the long blade is attached to the sleeve segment of the short elbow part as follows. Three segmented annular protuberances 17, on sleeve outer planes finger-shaped bearings 18 are installed, are inserted between the support rings 13 (FIG. 2) of the sleeve segment skeleton. Then long blade connecting shaft 15 is installed on the opening of the sleeve segment. The inset protuberances are secured by bolts 20 through holes 19 to the blade shaft. At the level of attachment of the removable annular protuberances, the blade shaft skeleton has reinforced walls 16 that protect it from breakage and damage. On the side of the wing-shaped blade, the end of the sleeve segment is tightly closed by one-piece or two-half annular flanges 21, equipped in the inner edges with rubber seals (not shown). The latter afford protection from entry of moisture and dirt between the support rings of the sleeve segment and the bearings of the annular protuberances of the connecting shaft of the wing-shaped blade. The flanges are secured by bolts (not shown) to the support rings of the sleeve segment skeleton. The face end of the shaft has a stepwise narrowing with a multifaceted star device, which then also narrows to a cylindrical shape. The faceted part of the shaft serves to secure hydraulic turn mechanism 29 through annular cam 28 (JP4104037, or in another invention), which supports rotation of the wing-shaped blade along its axis and positioning thereof at various wind stream speeds. Locking disk 26, which is of one piece or two halves, is installed on the cylindrical end of the shaft of the wing-shaped blade. They are secured by bolts 27 to the outer annular support of the sleeve segment.

The mechanisms connecting the sleeve segment of the short elbow part and the end shaft of the long wing-shaped blade may also have other design features. For example, the double end annular supports of the sleeve segment may be only two pairs located at the ends of the cylindrical skeleton, and the blade connecting shaft accordingly will have two pairs of removable protuberances. Other structures that are used in modern rotors to connect the blade handle with the wind turbine hub, also supporting the blade's rotation about its axis, may be used to connect the sleeve segment and the end shaft of the long wing-shaped blade.

The presence of a bend in the blade and accordingly the strength of the blade elbow on the twisting effect of wind speed, especially as the wind force strengthens, raises a certain concern. In the new wind wheel design, the aerodynamic pressure of the wind on the wing-shaped part of the blade is transmitted through the elbow at the bend. The short root part and the elbow bend experience pressure in two directions. The first is in the vertical direction, the force of gravity of the wing-shaped part, amplified by the torque of the aerodynamic pressure of the wind and the second is the effect of twisting due to the action of the opposing wind on the wing-shaped part of the blade. These actions are more noticeable as the blade length increases.

The technical robustness of the blade bend and overcoming the problem of "breakage" on the elbow bend under gravity and the wind stream drag acting on the long wing-shaped part of the blade are achieved by the fact that the bend on the side is strengthened by additional steel reinforcement 6 (FIGS. 1 and 2) of the top edges of the axial and sleeve segments. In addition, the axial and sleeve segments are strongly tightened by cables 7 (FIGS. 2, 3 and 4) to reduce the bending and connecting load[s] of the axial and sleeve parts of the short elbow segment. In case of a shortened form of the axial segment (FIG. 6), cables 7 are tightened between the sleeve segment and the central disk 30 in the wind turbine hub. The use of cables is a reliable securing for the tensile force of the long wing-shaped blade under the influence of gravity and wind pressure. The use of cables is a well-tested means of connection in the construction of suspension bridges, which experience similar loads. The lateral steel reinforcements on the edges of the axial and sleeve segments of the short elbow afford reliability from fracture under the twisting moment from the frontal action of the wind pressure.

A key point in the generation of power using wind is improving the coefficient of capture of the kinetic energy of the freely passing wind. Therefore, it is necessary to achieve a high wind flow density in the sweep area to the surface of the wing-shaped blade and "capture" of more and more of its mass, accordingly assuring a large aerodynamic effect of the wind stream within the swept area.

Figure 7:
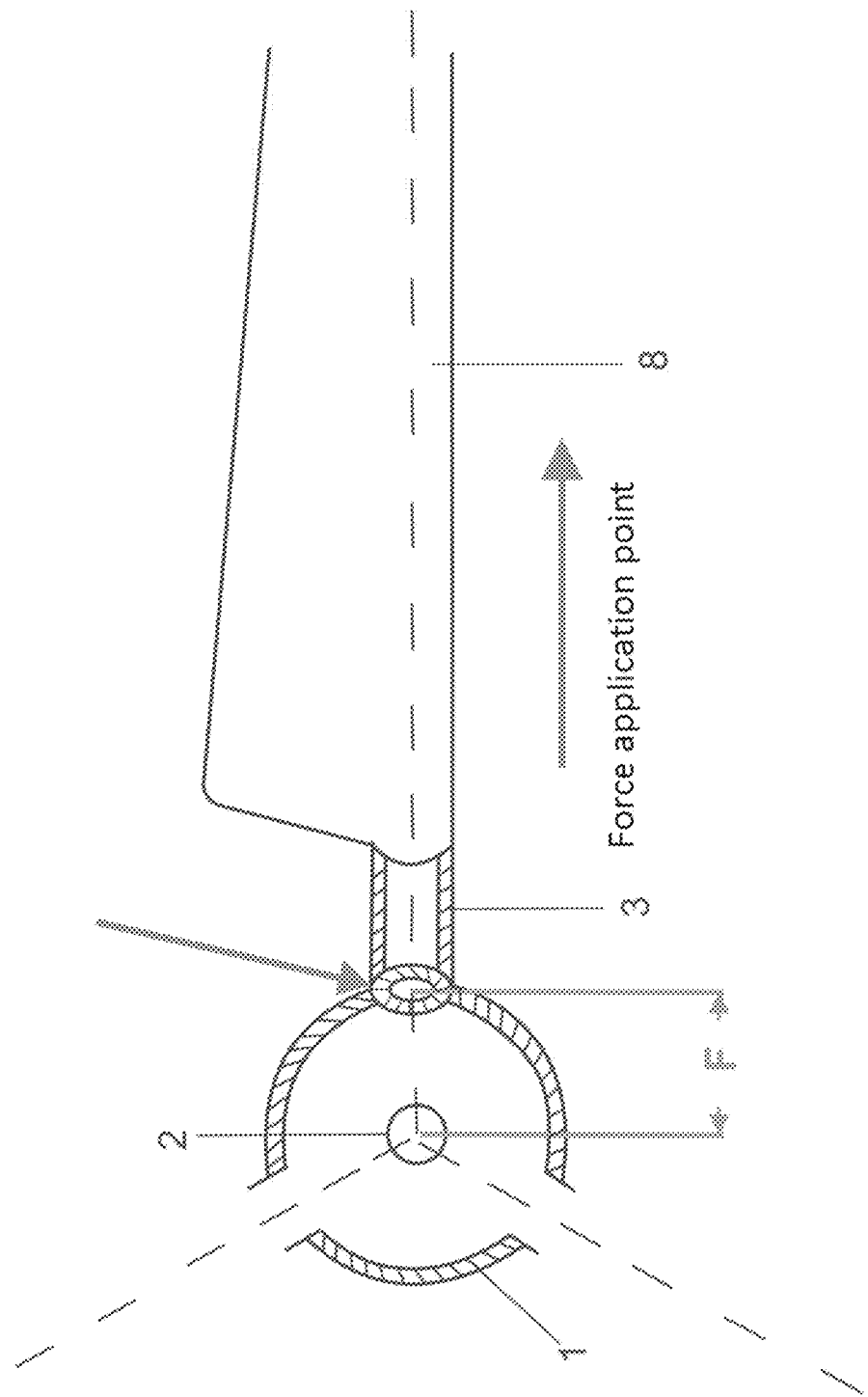
FIG. 7 shows the force application point in the blades of a conventional rotor design.

The force moment is known to be proportional to the lever arm (the distance between the center of rotation—here, the main shaft—and the point of force application). According to this postulate, in operational wind wheels with straight blades, the point of application of the blade leverage $F_1$ is the radius of the wind plant's hub, from the axis of the main shaft to the blade handle attachment point to the wind turbine hub (FIG. 7).

The present invention differs in that the short segment of the blade includes two parts: an axial segment, which is a continuation along the line of connection from the axis to the edge of the hub, and a sleeve segment that is connected to the axial segment at a 10-80° angle (more efficiently, 30-60°). This creates two lever fulcrums and two force application points (FIG. 8).

Figure 8:
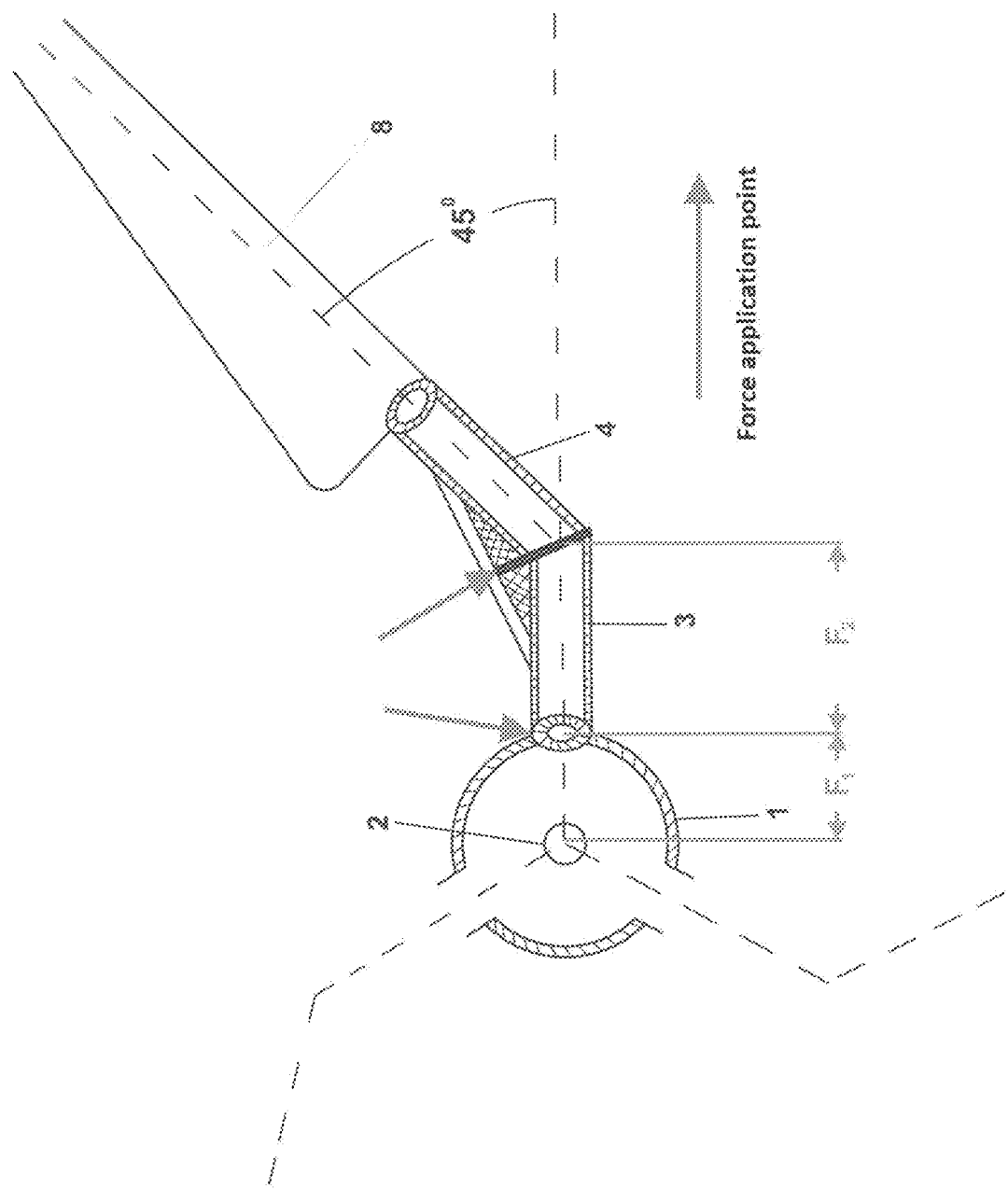
FIG. 8 shows the force application point in a blade with an elbow bend.

If we translate the functionality of the present wind wheel design to the lever law, the force moment $F_1$ is amplified further with the addition of the axial segment force $F_2$, and the angular position of the sleeve segment connected to the long wing-shaped blade acts as a lever, where the wind force is transmitted through two fulcrums, the elbow bend and the connection point of the axial segment to the plant hub (FIG. 8). The axial segment of the short part of the blade is the link that constitutes the additional force moment ($F=F_1+F_2$). The additional force transmitted is proportional to the increase in the length of the axial segment, which depending on the wind plant's planned capacity is 0.20-5 meters (of a link $F_2$). However, its efficiency will depend on the relation of the length of the latter and the wing-shaped blade, which is largely determined by the effort to achieve a high efficiency of the kinetic force of the wind stream and by rules of conservation of safety of the blade design.

The benefit of the wind wheel with elbow bend may be less significant in small wind plants because with rapid rotation, the blades also encounter increasing drag from the air mass not yet involved in the circulation of motion. In medium- and high-capacity wind plants, where the rotor speed is 11-16 rotations per minute, the design of blades with elbow bends and two fulcrums and two force application points located on one side communicates additional force effect much greater than with straight blades. Embodiments of the present invention, while preserving the modern design length of blades in medium- and high-capacity wind plants, creates a real basis for increasing capacity by two- or threefold, applying powerful generators, and reducing material and financial expenditures.

The position of the long wing-shaped part of the blades with a 10-80° angle to the axial attachment of the blade's root part helps amplify the motion of the wind stream, and its density on the plane of the wing increases somewhat. If the wind stream on straight blades, with distance from the center (here, from the wind plant hub) toward the periphery, flows out freely in the expanding space between the blades, then the long rotor blade of the present invention, assuming an angular position relative to the axis of attachment to the hub, remains constantly under the pressure of the wind stream. The difference of the invented blade or rotor design based on the principle of a lever with two arms and two force application points located on one side is specifically designed to easily overcome the resistance of a dense wind stream.

Figure 9:
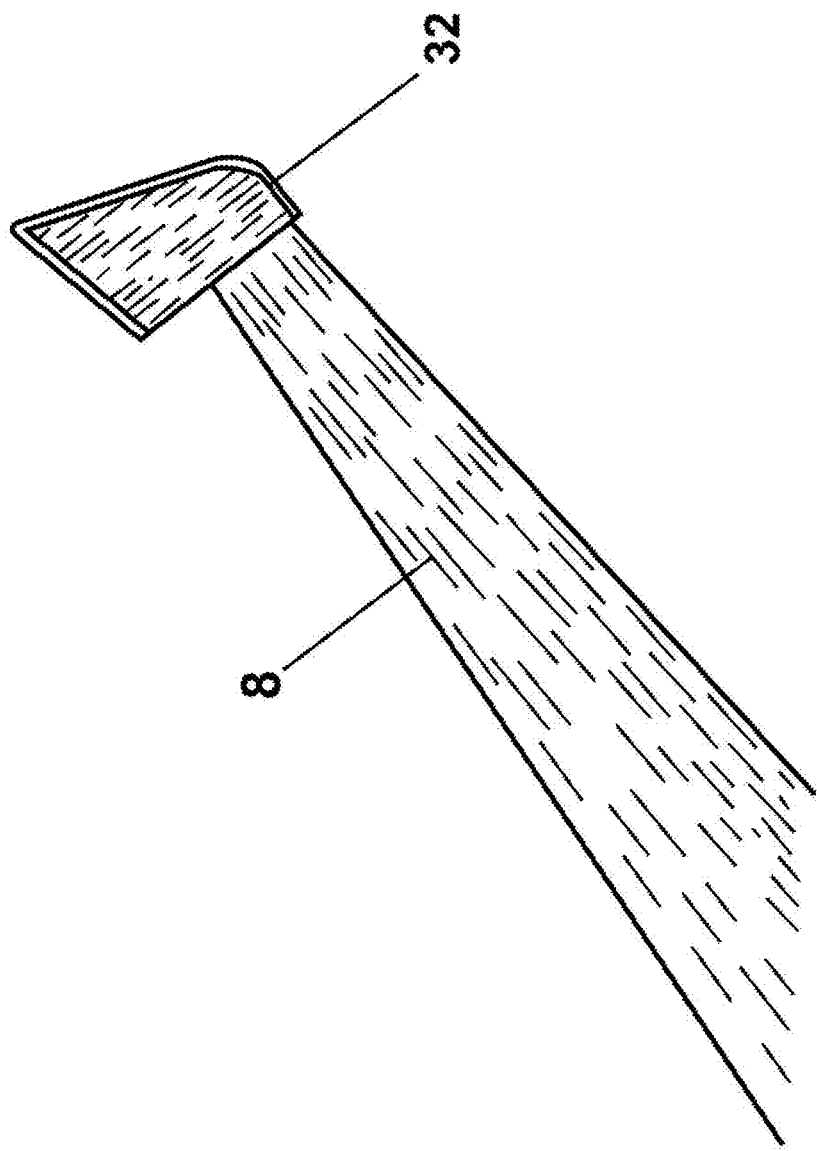
FIG. 9 shows the end of a wing-shaped blade with keel.

As an alternative option, embodiments of the present invention can include an additional structural device in the shape of a keel 32 (FIG. 9) installed at the end of wing 8 transversely to its plane. The height of this keel is 45-50 cm, which is a considerable impediment to separation of the wind stream from the end parts. The device has a triangular shape, lower (20-25 cm high) on the windward side, 45-50 cm high and somewhat elongated, by 20-25 cm, in the rear. The base of the keel protrudes rearward from the edge of the wing, and the triangular elongation extends in the top rear. The presence of a limiting keel at the end of the blade also helps create a high wind stream density along the entire length of the wing-shaped part.

The use of the blade design described herein on wind power plants, divided into a short part with elbow bend and a long wing-shaped part, by dint of the different transfer ratio through the principle of a lever system with two arms and two fulcrums located on one side, yields an additional force benefit greatly exceeding that when blades with a straight design are used. This increases the coefficient of rotational force of the wind stream, the energy generators, and also makes it possible to reduce the blade length and lower the weight of the wind engine nacelle and tower. This enables an increase in the generation of annual unit electrical power per unit of swept area, and reduce the cost per kilowatt-hour of energy for materials consumed and works performed.

The invention claimed is:
1. A wind wheel comprising:
a main shaft, wind plant hub and blades, each blade comprising two parts: a short part with axial and sleeve segments connected at an angle and a long wing-shaped part connected to the sleeve segment with an end shaft and by support devices with bearings, wherein the short part is made of steel, and at a distance of 1.5-5 meters or 0.20-1.5 meters from a connection between the short part and the hub, the angle between the axial and sleeve segments forms a 10°-80° elbow bend opposite a direction of rotation of the wind wheel, wherein the sleeve segment of the short part has a cylindrical skeleton and is connected to the wing-shaped part of the blade, wherein a root end of the wing-shaped part is supplied with a hollow steel shaft, wherein said shaft is connected with a skeleton of the wing-shaped part by tensioning bolts, wherein at the end of the sleeve segment close to the elbow bend are installed hydraulic mechanisms connected to the end of said shaft of the wing-shaped part via cams enabling the rotation of the wing-shaped part along an axis, wherein the cylindrical skeleton of the sleeve segment comprises three double support rings and in that said shaft of the wing-shaped part comprises three removable protuberances with bearings, wherein the three removable protuberances with bearings are inserted between the three double support rings and are tensioned to the shaft with bolts.

2. The wind wheel according to claim 1, wherein the axial segment of the short part is 1.5-5 meters long and is attached to the sleeve segment at the angle, wherein edges of connection points between the axial and sleeve segments face an inner bend therebetween and have steel reinforcements, and both segments of the short part are tensioned by cables.

3. The wheel according to claim 1, wherein the axial segment of the short part is 0.2-1.5 meters long and is attached to the sleeve segment at the angle, wherein edges of connection points of the axial segment face an inner bend between the axial and sleeve segments and have steel reinforcements, wherein cables supporting the elbow bend are tensioned between a central disk on the hub and the sleeve segment of the short part of the blade.

4. The wind wheel according to claim 1, wherein the short part with the elbow bend constitutes a lever with two arms and two fulcrums on one side, designed to leverage the density of a wind stream passing through the wing-shaped part of the blade.

5. A method of making the wind wheel according to claim 1, wherein a main arm force application being equal to a lever arm extending from an axis of the main shaft to the connection between the short part and the hub (F1) is amplified by an attachment of an axial segment, which constitutes a moment of additional force (F2), and imparts a greater aerodynamic effect (F=F1+F2), wherein the three removable protuberances with bearings are inserted between the three double support rings on the sleeve segment, after which the hollow steel shaft of the wing-shaped part is installed.

* * * * *